US007832625B2

(12) United States Patent
Nordgren et al.

(10) Patent No.: US 7,832,625 B2
(45) Date of Patent: *Nov. 16, 2010

(54) DONATION RECEPTACLE AND METHOD

(75) Inventors: Bradley C. Nordgren, Medina, MN (US); Nathaniel R. Hallee, Minneapolis, MN (US)

(73) Assignee: Northgreen Communications, Inc., Excelsior, MN (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/246,848

(22) Filed: Oct. 7, 2008

(65) Prior Publication Data

US 2009/0030855 A1 Jan. 29, 2009

Related U.S. Application Data

(63) Continuation of application No. 11/525,498, filed on Sep. 22, 2006, now Pat. No. 7,431,200.

(51) Int. Cl.
*B65G 11/04* (2006.01)

(52) U.S. Cl. ........................ 232/44; 232/1 D; 232/43.2; 194/348

(58) Field of Classification Search ....... 232/43.1–43.3, 232/1 D, 1 E, 4 R, 44, 55, 43.5, 15–16; 206/0.815; 220/476; 193/DIG. 1; 194/344, 346–348; 109/66

See application file for complete search history.

(56) References Cited

U.S. PATENT DOCUMENTS

| | | | | |
|---|---|---|---|---|
| 2,006,433 | A | 7/1935 | Bierstedt et al. | |
| 3,024,970 | A * | 3/1962 | Powers | 232/44 |
| 3,239,046 | A | 3/1966 | McGoldrick | |
| 3,990,630 | A | 11/1976 | Cutter | |
| 4,063,520 | A | 12/1977 | Parsons | |
| 4,483,255 | A | 11/1984 | Collier, Jr. et al. | |
| 4,489,662 | A | 12/1984 | Masachika | |
| 4,616,776 | A | 10/1986 | Blumenthal et al. | |
| 4,649,832 | A | 3/1987 | Hain et al. | |

(Continued)

FOREIGN PATENT DOCUMENTS

| | | |
|---|---|---|
| EP | 1 580 384 A1 | 9/2005 |

OTHER PUBLICATIONS

Northgreen Communications, Inc. brochure entitled "Friendship Series 2000 Drive-Thru Collector", publicly available at least as early as Jun. 2003; 2 pgs.

*Primary Examiner*—William L. Miller
(74) *Attorney, Agent, or Firm*—Dicke, Billig & Czaja, PLLC

(57) ABSTRACT

A method of promoting customer donations at a place of business includes providing a donation receptacle including a collection inlet, a proceeds bin, and at least one perforated section. The collection inlet is configured to receive monetary donations. The proceeds bin is configured to store the monetary donations received via the collection inlet. A donation path is at least partially defined between the collection inlet and the proceeds bin such that the monetary donations received via the collection inlet move along the donation path to the proceeds bin. The at least one perforated section is positioned along the donation path and is configured to separate the monetary donations from undesired refuse also received via the collection inlet. The donation receptacle is assembled to a cavity formed in a wall structure at the place of business.

8 Claims, 8 Drawing Sheets

U.S. PATENT DOCUMENTS 4,665,839 A 5/1987 Heyl
4,671,455 A 6/1987 Stockman
5,156,250 A * 10/1992 Parish et al. ................ 194/348
6,302,256 B1 10/2001 Ito et al.
6,920,835 B1 7/2005 Johnson
7,303,119 B2 12/2007 Molbak

* cited by examiner

DONATION RECEPTACLE AND METHOD

CROSS-REFERENCE TO RELATED APPLICATION

This is a continuation of U.S. patent application Ser. No. 11/525,498 filed on Sep. 22, 2006, now issued as U.S. Pat. No. 7,431,200, the teachings of which are incorporated herein by reference.

BACKGROUND

Donation collection boxes or other receptacles located in retail stores or other public locations provide important fundraising opportunities to many charities. Collection boxes are typically placed in locations selected to be convenient to donators and to allow donators to support the corresponding charities a few dollars or even a few cents at a time. For instance, donation receptacles are often placed near point-of-sale terminals, drive-thru terminals, or other locations where consumers or other passers-by, who would otherwise simply place change received at these locations into their purse or wallet, to donate the change to the charity corresponding with the particular donation receptacle.

However, oftentimes, placement of donation receptacles in easy to access locations also positions the receptacles in theft- or tampering-prone locations. As such, the donation receptacles often must be monitored by employees or volunteers or removed overnight to prevent theft of the donations or of the donation receptacle itself. Further, particularly in outdoor locations or locations positioned away from the point of sale, donation receptacles are unfortunately subjected to vandalism or other types of tampering. For example, donation receptacles placed in or outside a fast food restaurant may be filled with beverages such as shakes or sodas or other items of refuse by disrespectful individuals.

Conventional receptacles and depositories, which are generally positioned on the premises of banks, other financial institutions, or other more secure locations, do not generally account for the receipt of non-donation items or refuse, in particular, liquid refuse. As such, the conventional receptacle and depositories are not generally suitable for use in less secure locations or location more prone to tampering. Accordingly, a need exists for a donation receptacle that is suitable for use in such relatively non-secure locations.

SUMMARY

Some aspects in accordance with the principals of the present disclosure relate to a method of promoting donations at a place of business. A donation receptacle including a collection inlet, a proceeds bin, and at least one perforated section is provided. The collection inlet is configured to receive monetary donations. The proceeds bin is configured to store the monetary donations received via the collection inlet. A donation path is at least partially defined between the collection inlet and the proceeds bin such that the monetary donations received via the collection inlet move along the donation path to the proceeds bin. The at least one perforated section is positioned along the donation path and is configured to separate the monetary donations from undesired liquid refuse also received via the collection inlet. The donation receptacle is assembled to a cavity formed in a wall structure at the place of business, with the donation path extending from a front side of the wall structure, and the proceeds bin being accessible via an opening at a rear side of the wall structure.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "rear," "upward," "downward," "forward," "rearward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
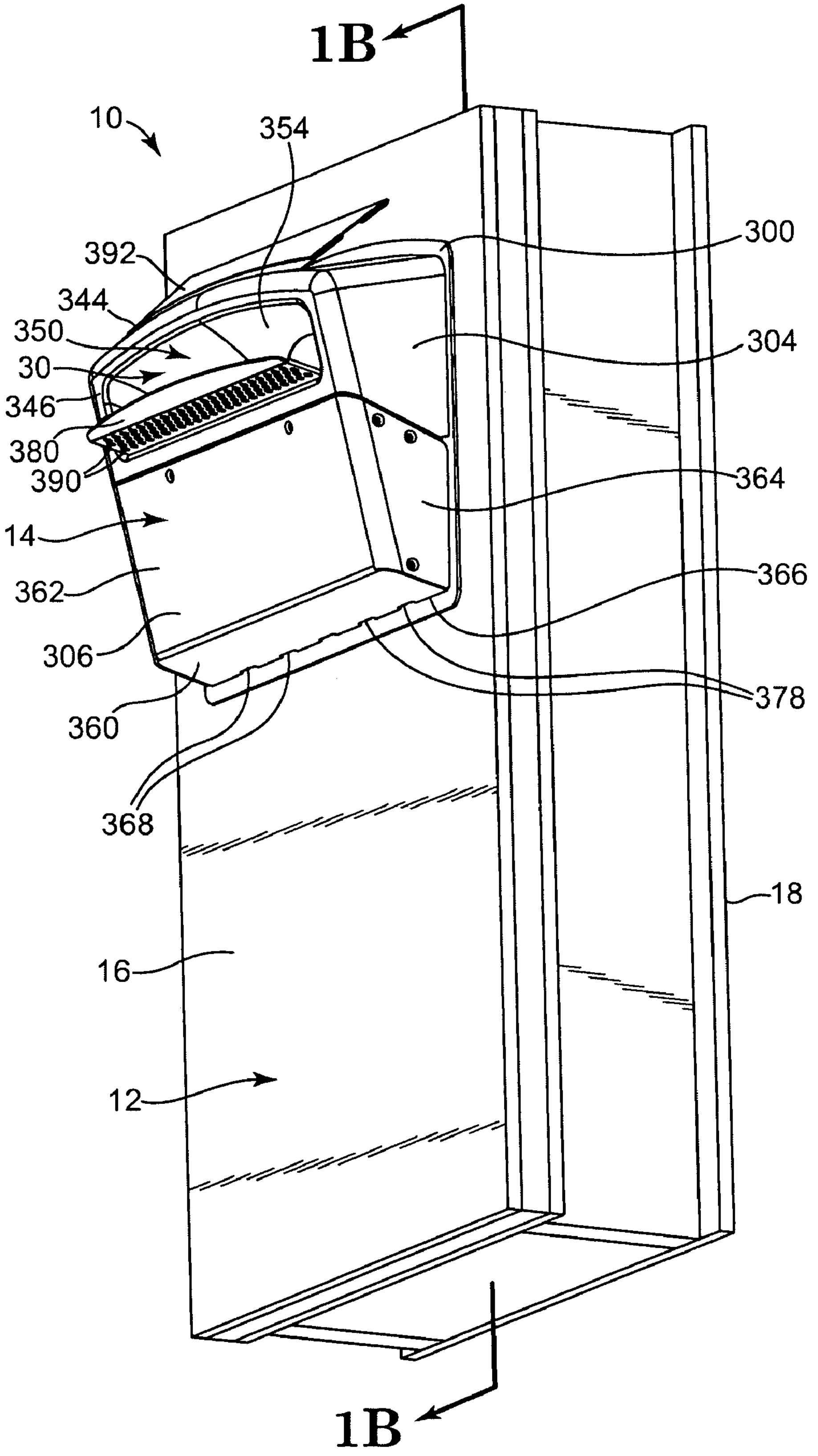
FIG. 1A is a front perspective view illustration of one embodiment of a collection system including donation receptacle installed within a wall.

FIG. 1A illustrates one embodiment of a collection system 10 including a wall 12 and a donation receptacle 14. The wall 12 defines a first or front side 16 and a second or rear side 18 opposite front side 16. The front side 16 is viewable and accessible by the general public and designates the side of the wall 12 from which donations and/or other deposits will be placed into the donation receptacle 14. The rear side 18 of the wall 12 designates a side of the wall 12 from which donations will be subsequently retrieved from the donation receptacle 14. In one embodiment, the rear side 18 is not accessible by the general public.

Figure 1B:
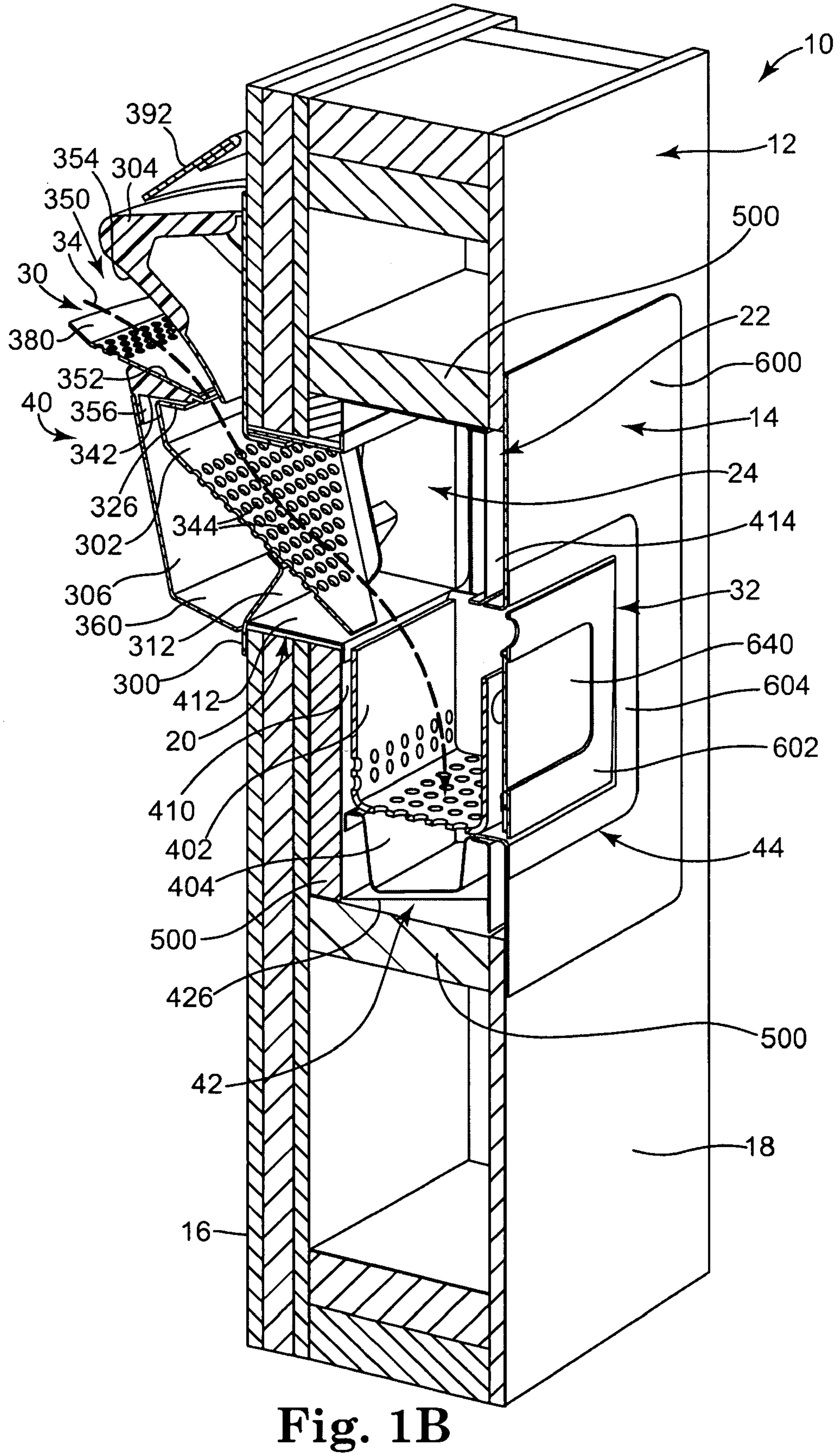
FIG. 1B is a rear perspective, cross-sectional view illustration of one embodiment of the donation receptacle of FIG. 1A taken along the line 1B-1B.

Additionally referring to FIG. 1B, wall openings 20, 22 are formed through wall sides 16, 18, respectively. A cavity 24 is formed in the wall 12 between and is generally accessible via each of the wall openings 20, 22. The donation receptacle 14 is positioned to be at least partially maintained within the wall cavity 24 and defines a collection inlet generally indicated at 30 on the front side 16 of the wall 12 and a collection outlet generally indicated at 32 on the rear side 18 of the wall 12. In view of this configuration, the donation receptacle 14 is configured to receive donations through the collection inlet 30, to advance received donations along a donation path generally indicated at 34, which is defined between the collection inlet 30 and the collection outlet 32, and to collect donations near the collection outlet 32 for subsequent retrieval.

Figure 2A:
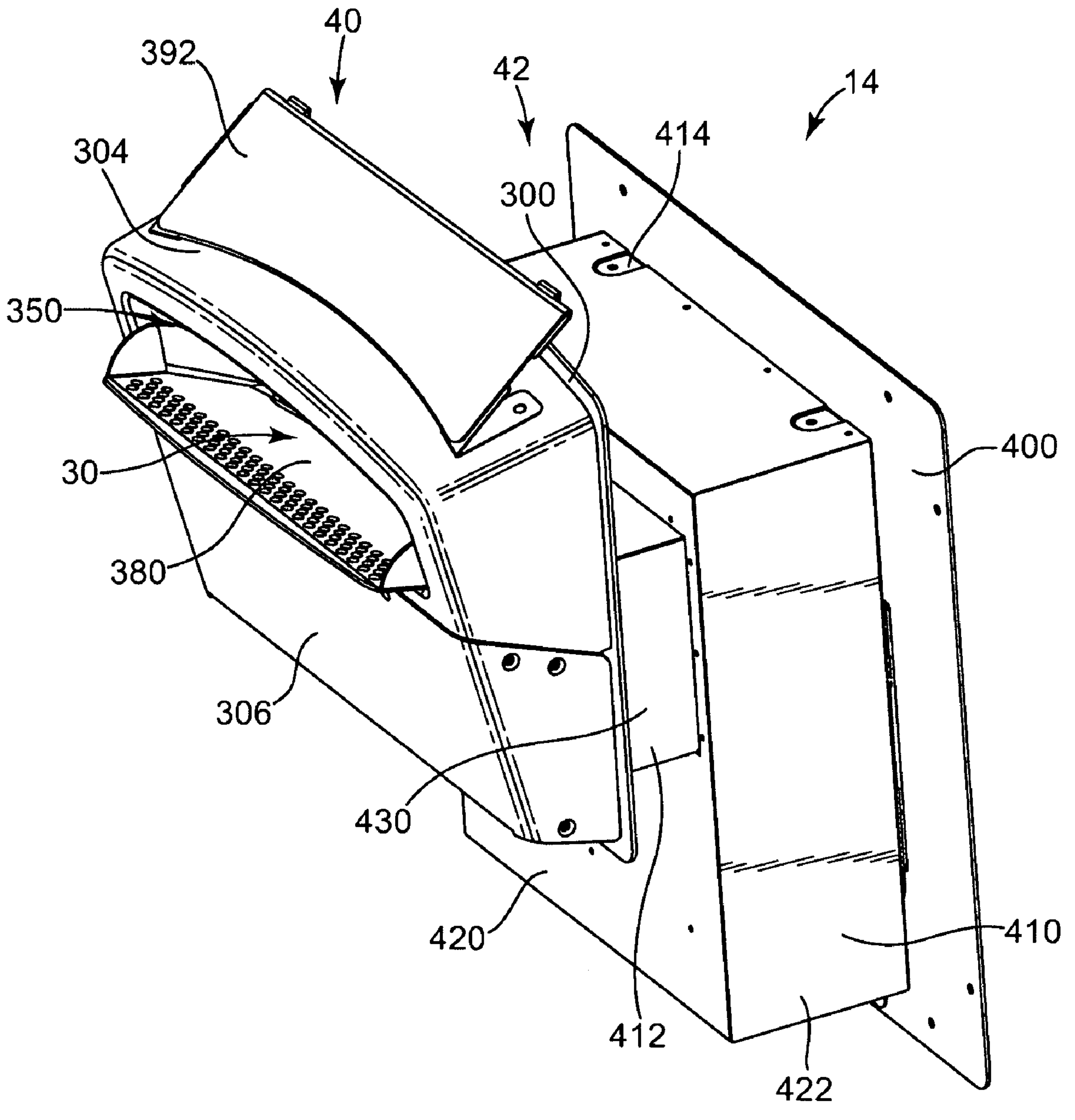
FIG. 2A is a front perspective view illustration of one embodiment of the donation receptacle of FIG. 1A.
Figure 2B:
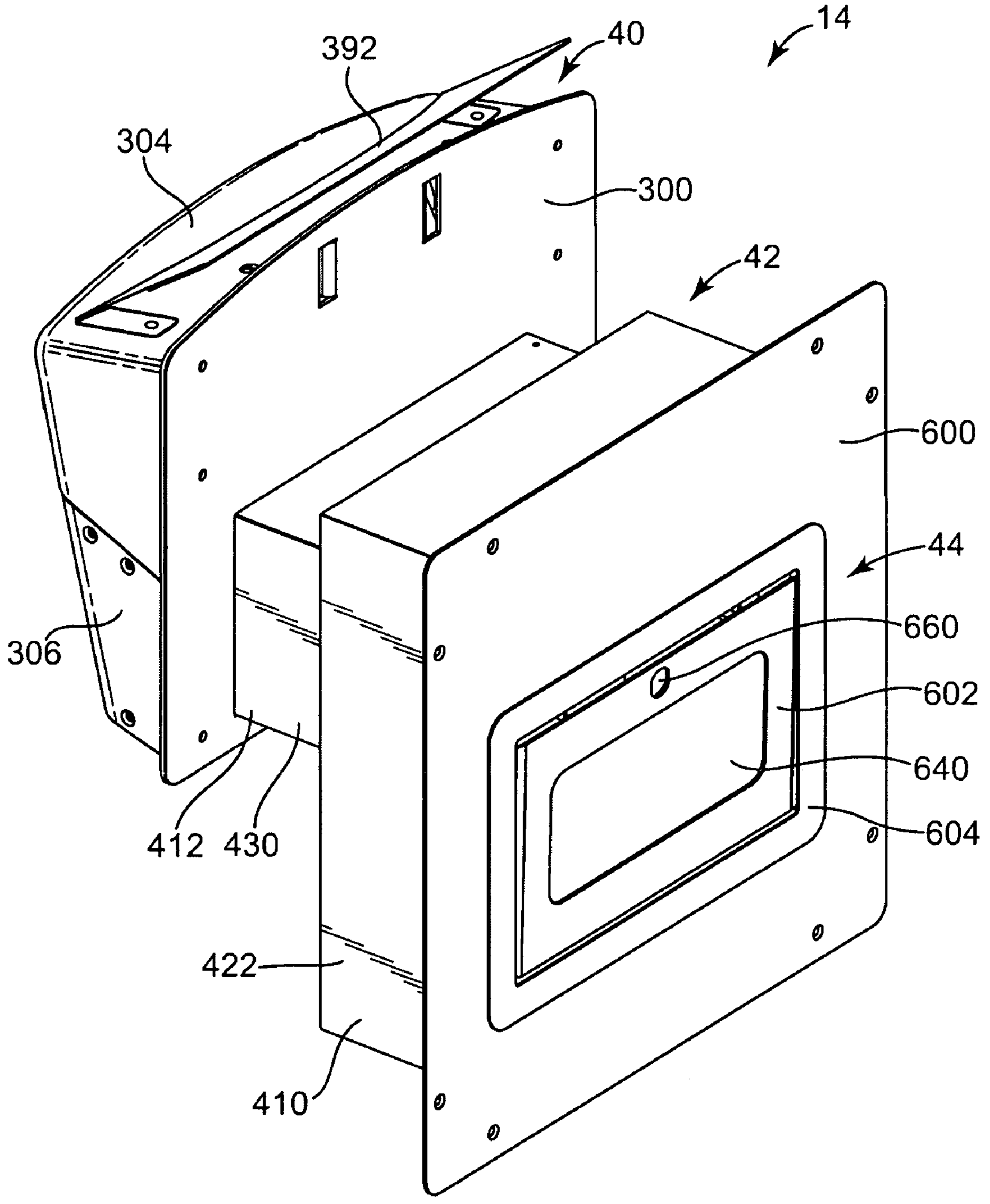
FIG. 2B is a rear perspective view illustration of one embodiment of the donation receptacle of FIG. 1A.

Referring specifically to FIG. 1B in view of FIGS. 2A and 2B, which respectively illustrate front and rear perspective views of one embodiment of the donation receptacle 14 without the wall 12 (FIG. 1B), in one embodiment, the donation receptacle 14 includes a front assembly 40, an internal assembly 42, and a door assembly 44. The front assembly 40 extends from the front side 16 of the wall 12 and defines the collection inlet 30. The internal assembly 42 is coupled with the front assembly 40 and is positioned substantially within the cavity 24 of the wall 12, and in one embodiment, at least partially defines the collection outlet 32. The door assembly 44 is positioned adjacent to or at least partially defines the collection outlet 32 and is configured to selectively cover and uncover the collection outlet 32.

Figure 3:
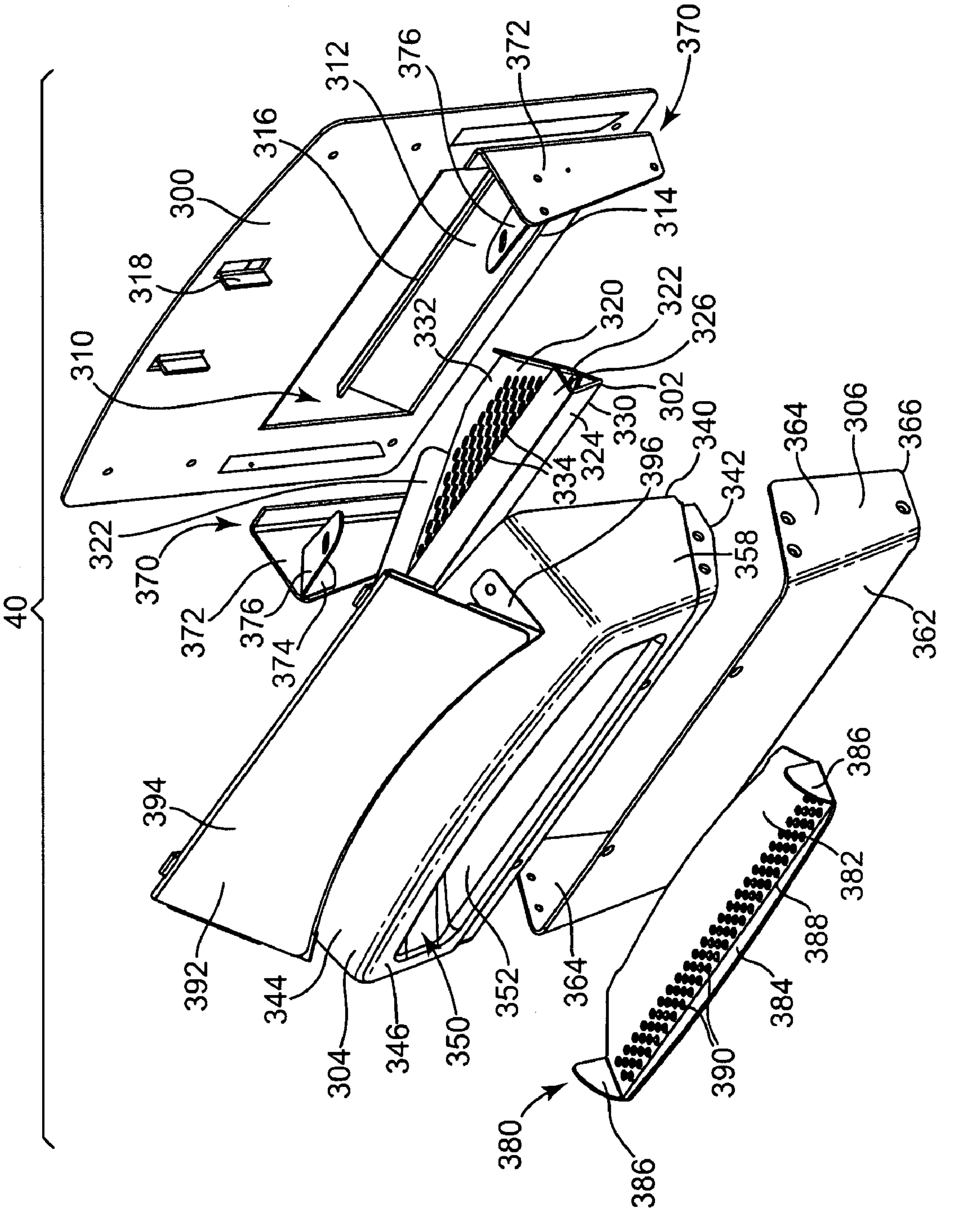
FIG. 3 is an exploded view illustration of one embodiment of a front assembly of the donation receptacle of FIGS. 1A and 1B.

FIG. 3 is an exploded, perspective view illustration of one embodiment of the front assembly 40. In one example, the front assembly 40 includes a front wall plate 300, a diverter 302, a collector hood 304, and a lower bracket 306. In general, the collector hood 304 and the lower bracket 306 are configured to be coupled to one another and/or to the front wall plate 300, and the diverter 302 is configured to extend from the collector hood 304 through the front wall plate 300.

In one embodiment, the front wall plate 300 is substantially planar except where specifically described otherwise and defines a generally rectangular perimeter. The front wall plate 300 defines an opening 310 at a relatively lower portion thereof. In one embodiment, the opening 310 is generally rectangular with an elongated axis extending in a generally horizontal manner.

In one example, the front wall plate 300 includes a diverter support segment 312 that extends from a lower edge 314 of the opening 310. In particular, the diverter support segment 312 extends with a slightly angled orientation upward and back from the remainder of the front wall plate 300. In one embodiment, the diverter support segment 312 extends along a substantial portion of a width of the opening 310. In one example, a support tab 316 extends from the diverter support segment 312 opposite the lower edge 314 of the opening 310. The support tab 316 is bent relative to the diverter support segment 312 and is configured to interface with the diverter 302. In one embodiment, the support tab 316 extends from the diverter support segment 312 at an angle of approximately 90°, however, it should be understood that other angled orientations of the support tab 316 relative to the diverter support segment 312 are also contemplated.

In one embodiment, the front wall plate 300 additionally defines one or more connection tabs 318. Each connection tab 318 extends forward from the remainder of the front wall plate 300 and is configured to facilitate alignment and coupling of the front wall plate 300 with the collector hood 304. The front wall plate 300 may be formed of any suitable material. In one embodiment, the front wall plate 300 is formed of powder coated steel.

In one embodiment, the diverter 302 defines a major portion 320, guide flanges 322, a bridge portion 324, and a coupling portion 326. In one example, the major portion 320 is substantially planar and is generally triangular or frustro-triangular in shape. As such, the major portion 320 defines a first end 330 and a second end 332 opposite the first end 330 where the first end 330 is substantially wider than the second end 332. The major portion 320 includes at least one apertures 334 positioned to facilitate diversion of liquid refuse from the donation path 34 by draining liquid refuse through the aperture(s) 334. Each aperture 334 may be formed of any suitable shape, such as a circle, square, triangle, elongated polygon, etc. In one embodiment, each aperture 334 defines a diameter or primary dimension that is substantially less than the diameter of coins or other monetary donations expected to be received via the donation receptacle 14. In one example, each aperture 334 is configured to define a diameter or primary dimension smaller than the diameter of a dime such that coins collected by the donation receptacle 14 move over but do not pass through the aperture(s) 334. Due to this configuration, the aperture(s) 334 effectively defines the major portion 320 as a perforated portion or section.

Each of the guide flanges 322 extends from the major portion 320 along at least a portion of the length between the first end 330 and the second end 332. The guide flanges 322 are each bent upward relative to the extension of the major portion 320 so as to funnel or guide the travel of donations especially loose coins over the major portion 320. In one embodiment, the guide flanges 322 extend with a substantially perpendicular orientation relative to the major portion 320.

The bridge portion 324 of the diverter 302 extends upward from the first end 330 of the major portion 320. The coupling portion 326 of the diverter 302 extends from the bridge portion 324 opposite the major portion 320 and is configured to interface with the collector hood 304. Although the diverter 302 may be formed of any suitable material, in one embodiment, the diverter 302 is formed of a high density polyethylene (HDPE), which has a relatively low coefficient of friction to encourage movement of donations over the diverter 302. In addition, although described as a single member, in one embodiment, additional perforated members (not shown) may be added to effectively extend the diverter 302 and thereby the donation path 24 (FIG. 1B) as necessary dependent upon the overall dimensions of the donation receptacle.

In one embodiment, the collector hood 304 defines a rear edge 340, a lower exterior surface 342 (most clearly illustrated in FIG. 1B), and an upper exterior surface 344. The lower exterior surface 342 and the upper exterior surface 344 are positioned opposite one another and each extend forward from the rear edge 340. In one embodiment, the upper exterior surface 344 extends further from the rear edge 340 than the lower exterior surface 342 extends from the rear edge 340. In this manner, a front surface 346, which extends between the lower exterior surface 342 and the upper exterior surface 344 opposite the rear edge 340, extends with a downwardly inclined orientation toward the rear edge 340. An opening 350 is defined on the front surface 346 between the lower exterior surface 342 and the upper exterior surface 344. The inclined orientation of the front surface 346 is configured to at least partially shield the opening 350 from precipitation that would otherwise fall into the opening 350. In one embodiment, the opening 350 serves as the collection inlet 30.

In order to decrease tampering with donations received by the donation receptacle 14, in one embodiment, a lower inlet wall 352 extends from a lower portion of the opening 350 toward the rear edge 340 and an upper inlet wall 354 (FIG. 1B) extends from an upper portion of the opening 350 toward the rear edge 340. In one example, the upper inlet wall 354 is configured to gradually extend closer to the lower inlet wall 352 the further the upper inlet wall 354 extends toward the rear edge 340. In this manner, the opening 350 tapers as it extends further into the donation receptacle 14 (i.e., as it extends toward the rear edge 340). This tapering of the collection inlet 30 serves to prevent or at least decrease the likelihood of individuals reaching into to grasp or to otherwise tamper with donations maintained within the donation receptacle 14. In one embodiment, one or both of the inlet walls 352, 354 are at least partially curved to further defer donation tampering.

In one example, the transition from the lower exterior surface 342 to the lower inlet wall 352 and the transition from the upper exterior surface 344 to the upper inlet wall 354 are smooth and generally curvilinear transitions. In this manner, in one embodiment, no sharp edges are presented in areas where an individual placing donations into the opening 350 is likely to contact and a smooth aesthetic appearance is provided. The collector hood 304 further defines side walls 358, which are positioned opposite one another and each extend between the lower exterior surface 342 and the upper exterior surface 344 and from the front surface 346 to the rear edge 340. In one embodiment, the collector hood 304 additionally defines a bracket coupling tab 356 (FIG. 1B) at least partially extending in a downward manner from the lower exterior surface 344 near the front surface 346 of the collector hood 304. The bracket coupling tab 356 is configured to facilitate coupling of the collector hood 304 with the lower bracket 306. Although the collector hood 304 may be formed of any suitable material, in one embodiment, the collector hood 304 is formed of an injection-molded polymeric material, such as polycarbonate, acrylic, etc.

Referring to FIG. 3 in view of FIG. 1B, in one embodiment, the lower bracket 306 includes a lower wall 360 (FIG. 1B), a front wall 362, and side walls 364. The front wall 362 extends from a front edge of the lower wall 360 such that the lower bracket 306 is formed with a substantially L-shaped cross section. The lower wall 360 extends back from the front wall 362 in a relatively horizontal, although slightly angled downward manner to define a rear edge 366. Rather than being substantially linear, the rear edge 366 of the lower bracket 306 includes a plurality of cutouts 368 as illustrated in FIG. 1A. In one embodiment, the cutouts 368 are substantially rectangular in shape and are spaced along the rear edge 366 such that the profile of the rear edge 366 resembles a square wave. The side walls 364 extend from opposite sides of the lower and front walls 360, 362 to enclose the lower bracket 306 about four of six sides. Like the other components described herein, the lower bracket 306 may be formed of any suitable size or shape dependent upon a desired aesthetic of the donation receptacle 14 and the amount of refuse likely to be handled by the lower bracket 306 as will be further described below. Although the lower bracket 306 may be formed of any suitable material, in one embodiment, the lower bracket 306 is formed of powder coated steel to match the front wall plate 300.

During construction of the front assembly 40, the diverter 302 is positioned to extend at least partially through the opening 310 of the front wall plate 300. In particular, in one embodiment, the major portion 320 of the diverter 302 is positioned to at least partially rest upon the support tab 316 of the front wall plate 300. In one embodiment, positioning the diverter 302 in the manner described above maintains the diverter 302 with a downward inclination. In this fashion, donations are encouraged to move over the diverter 302 via gravity. In one embodiment, the front assembly 40 additionally includes one or more diverter supports 370 extending from an exterior portion of the front wall plate 300 to further support the diverter 302. In one example, each diverter support 370 is welded or otherwise coupled with the front wall plate 300. In one embodiment, two of the diverter supports 370 are included and each diverter support 370 includes a first member 372 extending from the front wall plate 300 in a generally perpendicular manner. A second member 374 of each diverter support 370 extends from the first member 372 to define a support surface 376 for receiving and additionally supporting the diverter 302.

Once again referring to FIG. 1B, the collector hood 304 is positioned such that the lower exterior surface 342 interacts with and is coupled to the coupling portion 326 of the diverter 302. In this respect, the diverter 302 is at least partially supported by the collection hood 304 and thereby remains in position and is not likely to gradually sag away from the collector hood 304 after long periods of use. Once the collector hood 304 is properly positioned, the rear edge 340 (FIGS. 1A and 3) of the collector hood 304 is coupled with or interfaces with the front wall plate 300. In one embodiment, the collector hood 304 is coupled with the front wall plate 300 via snap fit connection, rivets, screws, adhesive, caulk, and/or other suitable connection devices or materials. In one example, the connection tabs 318 (FIG. 3) of the front wall plate 300 are also coupled or aligned with portions of the collector hood 304 to further facilitate attachment.

The lower bracket 306 couples with the collector hood 304 and the front wall plate 300. In particular, the front wall 362 of the lower bracket 306 is coupled with the collector hood 304, in particular, with the bracket coupling tab 356, via rivets, screws, adhesives, and/or any other suitable devices or materials at a position opposite the lower wall 360. When coupled with the collector hood 304, the front surface 346 of the collector hood 304 and the front wall 362 of the lower bracket 306 collectively define a substantially planar front of the donation receptacle 14. The side walls 364 of the lower bracket 306 are positioned to interface with the front wall plate 300 and generally align with the side walls 358 of the collector hood 304. In one embodiment, the side walls 364 of the lower bracket 306 are coupled with the front wall plate 300 via the diverter supports 370. The lower wall 360 also is configured to interface with the front wall plate 300. As illustrated with reference to FIG. 1A, in one embodiment, due to the cutouts 368 formed in the rear edge 366 of the lower bracket 306, when the lower bracket 306 is coupled with the substantially planar front wall plate 300, a plurality of apertures 378 are formed at the interface between the two members. The plurality of apertures 378 are configured to allow liquid refuse, if any, to seep out of the donation receptacle 14 during use.

In one embodiment, the front assembly 40 includes additional accessory members. For example, referring to the FIGS. 1B and 3, in one embodiment, the front assembly 40 includes an extension chute 380 configured to fit within the opening 350 of the collector hood 304 to further facilitate placement of donations into the collection inlet 30 of the donation receptacle 14. In one embodiment, the extension chute 380 defines a major portion 382, a lip 384, and guide walls 386. The major portion 382 is substantially planar and defines a front edge 388 and at least one aperture 390 near the front edge 388. Each aperture 390 may be formed of any suitable shape, such as a circle, square, triangle, elongated polygon, etc. In one embodiment, each aperture 390 defines a diameter or primary dimension that is substantially less than the diameter of coins or other monetary donations expected to be received via the donation receptacle 14. In one example, each aperture 390 is configured to define a diameter or primary dimension smaller than the diameter of a dime.

The lip 384 extends upwardly from the major portion 382 so as to guide advancement of the donations over the extension chute 380. In one embodiment, the lip 384 extends from the major portion 382 with an angle approximately 25°. The guide walls 386 extend upward from opposite side edges of the major portion 382 relatively near the front edge of the major portion 382 and are configured to guide donations over the extension chute 380. In one embodiment, each of the guide walls 386 extends with a substantially perpendicular orientation relative to the major portion 382. The lip 384 and guide walls 386 are particularly useful in collecting and directing coin donations along the donation path 24. In one embodiment, the extension chute 380 is formed of any suitable material, such as a thermal plastic material (e.g., polycarbonate, acrylic, etc.).

The extension chute 380 is positioned to extend partially over and forward from the lower inlet wall 352 of the collector hood 304. In this manner, upon assembly, the extension chute 380 extends in an angled manner upward from the inner-most portion of the collection hood 304 forward. As a result, the inclination of the extension chute 380 facilitates advancement of the donations into the donation receptacle 14 via the force of gravity. During use, each of the aperture(s) 390 may be used to encourage liquid refuse to seep through each of the aperture(s) 390 via the force of gravity prior to entrance into the donation receptacle 14 while still maintaining any donations received in the donation receptacle 14.

In one embodiment, the front assembly 40 also includes a promotion holder 392. In one example, the promotion holder 392 includes a major member 394 and at least one foot 396 as illustrated in FIG. 3. The major member 394 is configured to receive promotional indicia including identification of the charity or any other promotion or advertisement related to the charity associated with the donation receptacle 14. In one embodiment, the at least one foot 396 extends from the bottom portion of the major member 394 and is configured to be coupled with the upper exterior surface 344 of the collector hood 304. In particular, upon the attachment of the one of more feet 396 of the promotion holder 392 to the collector hood 304, the major member 394 is configured to extend in an upward and slightly rearward manner from the remainder of the collection hood 304. In this way, indicia or other information included on or maintained by the major member 394 of the promotion holder 392 is easily viewable by individuals positioned slightly above the donation receptacle 14. It should be understood that the promotion holder 392 may be formed in any variety of shapes and sizes configured the have a desired appearance or to receive particular promotional materials as desired. The promotion holder 392 may be formed of any suitable material, such as a thermal plastic material, a metal material, or other suitable material.

Figure 4:
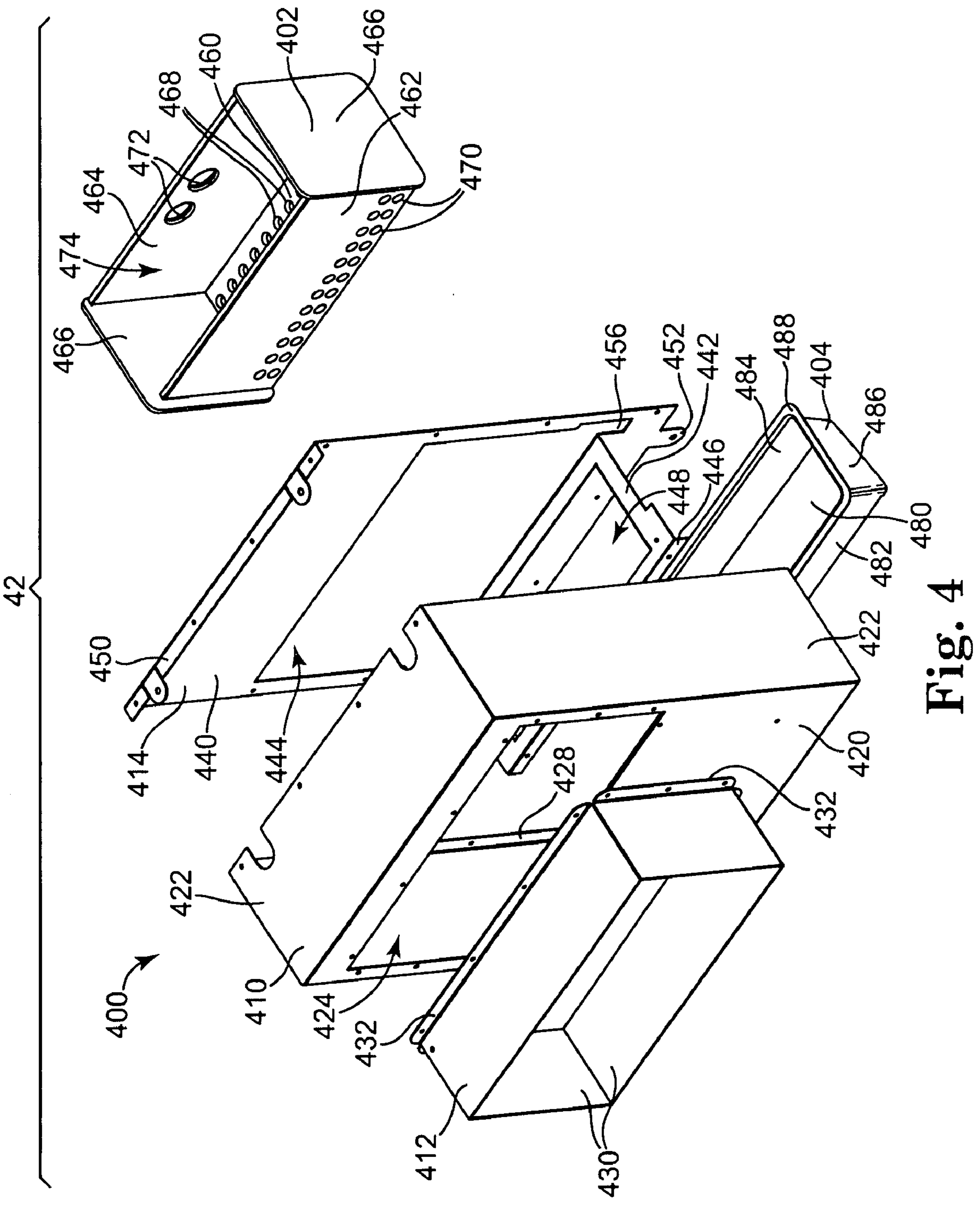
FIG. 4 is an exploded perspective view illustration of one embodiment of an internal assembly of the donation receptacle of FIGS. 1A and 1B.

FIG. 4 illustrates an exploded, perspective view of one embodiment of the internal assembly 42. In one embodiment, the internal assembly 42 includes a liner 400, a proceeds bin 402, and a refuse tray 404. The liner 400 is configured to line the wall cavity 24 and is a fluid barrier that generally prevents or at least decrease the movement of fluids, insects, etc. from the wall 12 into the donation receptacle 14 or vice versa. The proceeds bin 402 is any suitable container, such as a basket, tray, etc., and is positioned within the liner 400 and is configured to receive and maintain monetary donations received via the collection inlet 30 (FIG. 1). The refuse tray 404 is any suitable container configured to receive any undesirable refuse, such as beverages, etc. collected by the donation receptacle 14 that are removed from the proceeds bin 402. The refuse tray 404 may be sized as desired to accommodate expected levels of liquid refuse received by the donation receptacle 14.

In one embodiment, the liner 400 is a liner assembly formed of a plurality of members. For example, the liner 400 includes a liner box 410, a liner extension 412, and a liner back plate 414. The liner box 410 includes a major member 420 and four side walls 422. The major member 420 is substantially planar and generally rectangular and defines an opening 424 at an upper portion thereof. In one example, the opening 424 is substantially rectangular in shape with the primary, elongated axis extending in a generally horizontal manner substantially perpendicular to the donation path 34 (FIG. 1B). The side walls 422 each rearwardly extend from an edge of the major member 420 with an orientation substantially perpendicular to the major member 420.

However, in one embodiment as illustrated with reference to the partial cross-sectional view of FIG. 5, the bottom side wall 426 rearwardly extends from a lower edge of the major member 420 partially upward (i.e. towards the opposite side wall 422 of FIG. 4) to form an inclined side wall 426. Referring back to FIG. 4, in one embodiment, a flange member 428 extends from each of the four side walls 422 opposite the major member 420. Each flange member 428 extends from the corresponding side wall 422 toward an opposite one of the side walls 422 and is configured to facilitate attachment of the liner box 410 to the liner back plate 414. In one embodiment, the flange member 428 of the bottom side wall 426 alternatively extends away from the opposite side wall 422 in a downward manner. In one embodiment, the liner box 410 is fabricated from a galvanized sheet metal or otherwise formed in any suitable method and from any suitable material.

In one embodiment, the liner extension 412 includes a plurality of side walls 430. In particular, in one example, there are four side walls 430 arranged end to end to form a rectangular sleeve. In one example, connection flanges 432 extend from one edge of the resulting sleeve to facilitate coupling of the liner extension 412 with the liner box 410. In one example, the liner extension 412 is fabricated from galvanized sheet metal. However, liner extension 412 may be formed of any suitable material and by any suitable manufacturing process.

The liner back plate 414 includes a major member 440 and a shelf 442. In one example, the major member 440 is substantially planer and generally rectangular in shape. An opening 444 is defined in the major member 440 and, in one embodiment, is substantially rectangular with the primary, elongated axis of the opening 444 extending in a horizontal direction generally perpendicular to the donation path 34 (FIG. 1B). The shelf 442 extends forward from a bottom edge of the opening 444 in a generally perpendicular manner relative to the major member 440. A flange 446 extends downward from a front edge the shelf 442 opposite the major member 440 with a substantially perpendicular orientation relative to the shelf 442. The flange 446 is configured to facilitate connection of the liner back plate 414 with the liner box 410. In one embodiment, the shelf 442 defines an opening 448 extending throughout a substantial portion thereof. In one embodiment, the opening 448 is substantially rectangular and configured to receive the refuse tray 404.

In one embodiment, an upper connection tab 450 extends forward from an upper edge of the major member 440. The upper connection tab 450 is configured to facilitate connection with the liner box 410 and/or the wall 12 (FIG. 1B). In one example, one or more lower connection tabs 452 extend from a lower edge of the major member 440 opposite the upper tabs 450. The lower connection tabs 452 extend parallel to the major member 440, in particular, in one embodiment, the lower connection tabs 452 are positioned in the same plane as the major member 440. The lower connection tabs 452 are configured to facilitate attachment of the liner back plate 414 to the wall 12 or other portion of the donation receptacle 14 (FIG. 1A). In one embodiment, a cutout 456 extends from each lower side of the opening 444 of the major member 440 down below the extension of shelf 442 there-from. In one embodiment, each cutout 456 is substantially rectangular and is configured to facilitate attachment the door assembly 44 (FIG. 1B).

The proceeds bin 402 is generally a rectangular box configured to receive the proceeds that travel to the proceeds bin 402 along the donation path 34 (FIG. 1B). The proceeds bin 402 includes a bottom member 460, a front wall 462, a rear wall 464, and side walls 466. The bottom member 460 is substantially rectangular and defines at least one aperture 468 therein, which is configured to divert unwanted refuse such as beverages, etc. from the proceeds bin 402. Each aperture 468 may be formed of any suitable shape, such as a circle, square, triangle, elongated polygon, etc. In one embodiment, each aperture 468 defines a diameter or primary dimension that is substantially less than the diameter of coins or other monetary donations expected to be received via the donation receptacle 14. In one example, each aperture 468 is configured to define a diameter or primary dimension smaller than the diameter of a dime. Front and rear walls 462 and 464 each extend from the elongated edges of the bottom member 460 and are positioned opposite one another.

In one embodiment, the front wall 462 additionally includes at least one aperture 470 configured to assist in diverting refuse from the proceeds maintained within the proceeds bin 402. Each aperture 470 may be formed of any suitable shape, such as a circle, square, triangle, elongated polygon, etc. In one embodiment, each aperture 470 defines a diameter or primary dimension that is substantially less than the diameter of coins or other monetary donations expected to be received via the donation receptacle 14. In one example, each aperture 470 is configured to define a diameter or primary dimension smaller than the diameter of a dime. With this in mind, the aperture(s) 468 and/or 470 of the proceeds bin 402 defines the proceeds bin 402 as a perforated tray 402.

In one embodiment, the rear wall 464 includes one or more handling features 472. In particular, in one embodiment, the rear wall 464 includes two holes 472 as the handling features. The handling features 472 are configured to facilitate movement of the proceeds bin 402 into the donation receptacle 14 and out of the donation receptacle 14 for an individual to process the proceeds received. In other embodiments, the handlings features 472 may include one or more of a handle, an indentation, a tab, or other suitable handling features. The side walls 466 each extend from opposite edges of the bottom member 460 between the front wall 462 and rear wall 464 to effectively define a proceeds bin 402 with a cavity 474.

In one embodiment, the refuse tray 404 is also a box-like tray including a bottom member 480, a front wall 482, a rear wall 484 and side walls 486. In one embodiment the bottom member 480 is substantially planer and generally rectangular in shape. The front wall 482 and the rear wall 484 extend from the elongated edges of the bottom member 480 with a generally upward or substantially perpendicular orientation relative to the bottom member 480. The side walls 486 each extend from an edge of the bottom member 480 between the front wall 482 and the rear wall 484. In one embodiment, a top flange 488 extends outwardly from an upper perimeter edge of the refuse tray 404 from each of the walls 482, 484, and 486 opposite the bottom member 480. In one embodiment, the front wall 482 is substantially taller than rear wall 484. In this manner, the bottom member 480 is spaced further from the top flange 488 near the front wall 482 than the rear wall 484. With this in mind, in one embodiment, each side wall 486 is generally non-rectangular, but rather is formed in a triangular or frustro-triangular shape.

During assembly of the internal assembly 42, the liner 400 is constructed. In particular, the liner extension 412 is coupled with the liner box 410. More particularly, in one embodiment the liner extension 412 is inserted from the back of the major member 420 and moved forward to at least partially extend through the opening 424 defined in the liner box 410. As such, the side walls 430 of the liner extension extend forward from the major member 420 of the liner box 410 and the connection flanges 432 of the liner extension 412 are positioned on an opposite or back side of the major member 420 of the liner box 410. In one embodiment, rivets or other suitable connection devices or adhesives are used to secure the connection flanges 432 to the liner box 410 about the liner box opening 424. The extension of the liner extension 412 from the liner box 410 upon assembly is more clearly illustrated with reference to FIGS. 2A and 2B.

The liner back plate 414 is also coupled with the liner box 410. The liner back plate 414 is aligned with the liner box 410 opposite the liner extension 412. In particular, the major member 440 of the liner back plate 414 is aligned with the flange members 428 of the liner box 410. When in this position, the shelf 442 of the liner back plate 414 extends into the liner box 410. As such, the liner back plate 414 is coupled with the liner box 410, via rivets, screws, other devices and/or adhesives to connect the major member 440 of the liner back plate 414 to the flange members 428 of the liner box 410. In one embodiment, the connection flange 446 of the back liner plate 414 is also coupled to the major member 420 of the liner box 410 to further secure and support the shelf 442 within the liner box 410. In one example, the upper connection tabs 450 of the back plate liner 414 may additionally be coupled with the upper side wall 422 of the liner box 410 in any suitable manner.

In one example, the refuse tray 404 is moved through the opening 444 in the liner back plate 414 and positioned at least partially through the opening 448 of the shelf 442. In particular, in one embodiment, the refuse tray 404 is positioned such that the bottom member 480 and the walls 482, 484, 486 extend down through the opening 448. The top flange 488 of the refuse tray 404, however, has a perimeter greater than the opening 448 of the shelf 442. As such, the flange 488 does not fit through the opening 448 in the shelf 442. In this manner, the refuse tray 404 is hung from the shelf 442 of the liner back plate 414. In one embodiment, the inclination of the bottom member 480 of the refuse tray 404 is similar to the inclination of the bottom side wall 426 such that the refuse tray 404 is at least partially supported by the bottom wall 426 as illustrated in FIG. 1B. In one example, the inclination of the bottom wall 426 and the refuse tray 404 facilitates monitoring of the amount of refuse contained in the refuse tray 404 and/or facilitates removal of the refuse tray 404 with a decreased risk of spilling any refuse contained therein.

The proceeds bin 402 is subsequently moved through the opening 262 and is placed on top of the shelf 442. The proceeds bin 402 has a larger outer perimeter than the opening 444 in the shelf 442 such that the shelf 442 supports the proceeds bin 402 directly above the refuse tray 404. Accordingly, refuse dripping from the aperture(s) 468 and/or 470 of the proceeds bin 402 will be collected in the refuse tray 404. Although primarily described as being selectively removable from the internal assembly 42, in other embodiments the proceeds bin 402 may be stationary within or integrally formed with other portions of the internal assembly 42.

Figure 6:
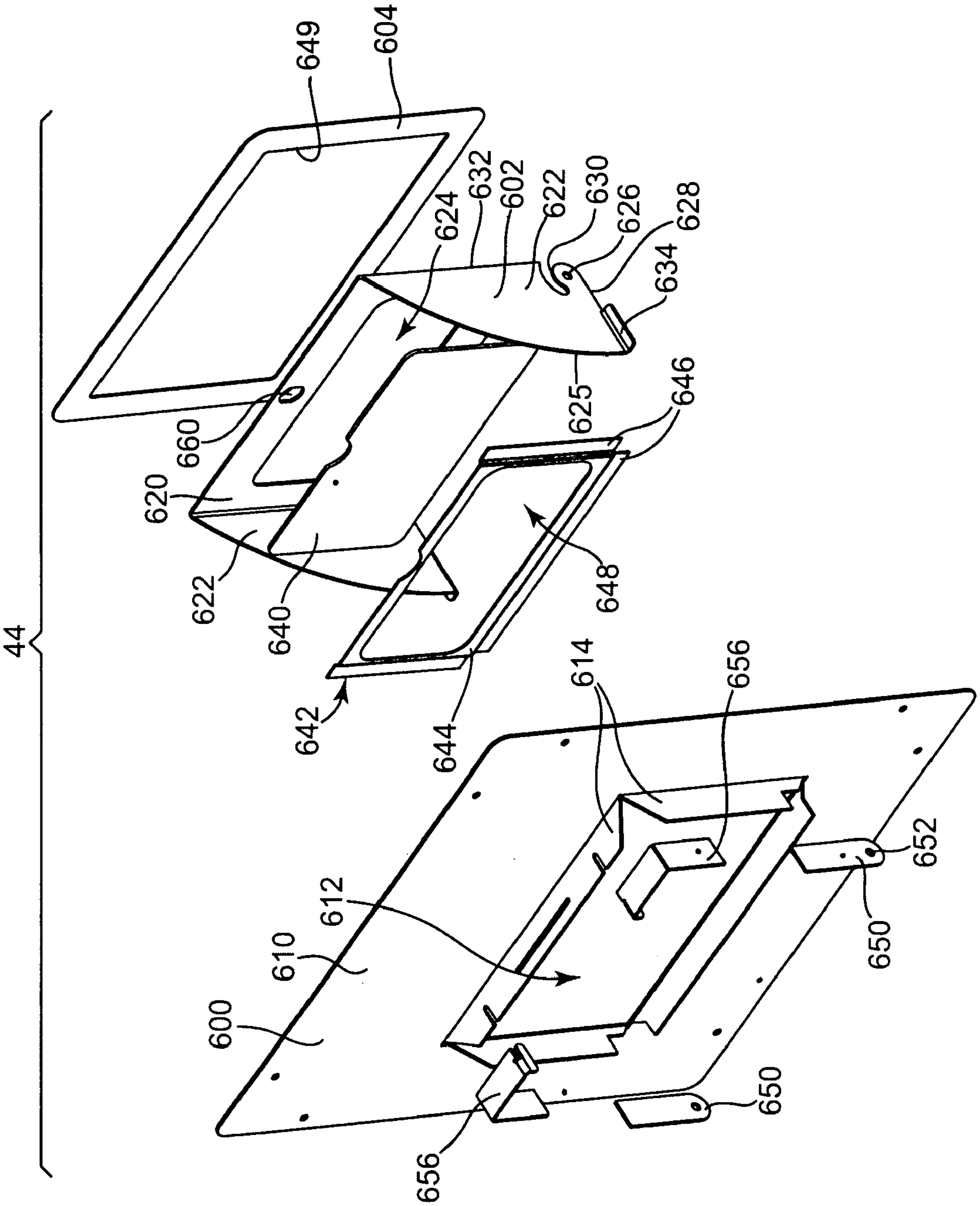
FIG. 6 is an exploded, front perspective view illustration of one embodiment of a door assembly of the donation receptacle of FIGS. 1A and 1B.

FIG. 6 illustrates an exploded, perspective view of one embodiment of the door assembly 44 including a rear wall plate 600, a door 602, and an outlet frame 604. The rear wall plate 600 is configured to be coupled with the rear side 18 of the wall 12 to frame the collection outlet 32 (FIG. 1B). The door 602 is configured to selectively open and close the collection outlet 32, which is bordered by the outlet frame 604, thereby selectively providing access to the internal assembly 42 of the donation receptacle 14 (FIG. 1B).

In one embodiment, the rear wall plate 600 includes a major member 610 that is generally planar and substantially rectangular in shape. The rear wall plate 600 is formed to have a size that is substantially larger than the wall opening 22 in the rear side 18 of the wall 12 (FIG. 1B). An opening 612 is defined in the rear wall plate 600 that is generally rectangular. More specifically, the opening 612 is similar in shape and slightly smaller in size than the opening 444 of the liner back plate 414. In one example, flanges 614 extend forward from the major member 610 about a perimeter of the opening 612.

The door 602 may be any suitable door configured to selectively cover and uncover the collection outlet 32. In one example, the door 602 includes a major member 620 and two side members 622 extending from opposite sides thereof. The major member 620 is substantially planar and generally rectangular in shape. In one embodiment, the major member 620 defines an opening 624. The side members 622 of the door 602 each extend from the major member 620 with a generally perpendicular orientation.

Each side member 622 extends from a top edge of the major member to below the major member 620 in the orientation of FIG. 6. In one example, each side member 622 defines a substantially curvilinear edge 625 that extends from the top edge of the major member 620 to a front portion of the lower edge 628 of the side member 622. In one embodiment, a pivot member 626 extends from a rear portion of the lower edge 628 of each of the side members 622 away from other side member 622. The pivot members 626 collectively define an axis about which the door 602 will rotate. In one example, a curvilinear cutout 630 extends from a rear edge 632 (i.e., an edge adjacent the major member 620) of the side member 622 partially around but spaced radially outward from the pivot member 626. In one example, the curvilinear cutout 630 is concentrically positioned relative to the pivot member 626. A stop tab 634 extends from a front portion of the lower edge 628 of each side member 622 away from the opposite side member 622. The door assembly 44 is substantially constructed during installation of the donation receptacle 14 into the wall 12 (FIG. 1B) as will be further described below.

In one embodiment, the door 602 includes a window 640 coupled to the major member 620 with a window bracket 642. The window 640 is any suitably sized and shaped transparent or at least translucent member configured to allow individuals to see through the door 602 and into the internal assembly 42 (FIG. 1B) to determine if the internal assembly 42 is in need of service. In one example, the window 640 is formed of a polymeric material, such as polycarbonate, etc., or any other suitable material.

The window bracket 642 defines a recessed portion 644 and flanges 646. The recessed portion 644 is sized to receive the window 640 and defines an aperture 648. Each of the flanges 646 extends about a portion of the perimeter of the recessed portion 644. In one embodiment, the recessed portion 644 is offset relative to the flanges 646 a distance substantially equal to or greater than a thickness of the window 640. In one embodiment, the window bracket 642 is fabricated from stainless steel or is otherwise manufactured from any suitable material.

To assemble the door 602, the window 640 is placed within the recessed portion 644. The window bracket 642 with the window 640 is positioned relative to the major member 620 such that the aperture 624 of the major member 620 is generally aligned with the aperture 648 of the window bracket 642 and such that the window 640 is interposed between the recessed portion 644 and the major member 620. Once positioned, the flanges 646 of the window bracket 642 are coupled with the major member 620 of the door 602 via welds, rivets, screws, adhesives, or any other suitable connection member or material. In this configuration, the window 640 is interposed between the major member 620 and the window bracket 642 to couple the window 640 to the major member 620.

The outlet frame 604 is configured to finish the opening 612 of the rear wall plate 600. Accordingly, in one example the outlet frame is sized similar to but slightly larger than the opening 612. The outlet frame 604 defines an opening 649 therein that is sized and shaped similar to the opening 612 in the rear wall plate 600. Upon assembly, as will be described below, the outlet frame 604 is coupled to the rear plate 600 to frame the opening 612 of the rear wall plate 600. Although the outlet frame 604 may be formed of any suitable material, in one example, the outlet frame 604 is formed of stainless steel.

Referring to FIG. 1B, during installation of the donation receptacle 14 into the wall 12, the openings 20, 22 and the cavity 24 are formed in the wall 12 if they are not already existing within the wall 12. In one embodiment, various framing members 500 may be added within the wall 12 to frame the cavity 24 as necessary to support and/or space various members of the donation receptacle 14 based upon the particular properties of the donation receptacle 14. In one embodiment, the front and rear sides 16 and 18 are positioned apart from one another a distance defining a width of the wall 12 in the range of about 8 inches to about 11.5 inches. However, a wall having a width less than 8 inches and more than 11.5 inches can be accommodated as will be apparent to one of skill in the art to service particular needs and projected donation loads.

The internal assembly 42 is inserted into the wall cavity 24. The internal assembly 42 may be either assembled as described above prior to insertion into the wall cavity 24 or at least partially assembled within the cavity 24. In one embodiment, where the internal assembly 42 is assembled prior to insertion into the cavity 24, the internal assembly 42 is moved from the rear side 18 of the wall 12 through opening 22 and into cavity 24. Once in place, a front edge of the liner extension 412 is substantially flush with the front side 16 of the wall 12 and the liner back plate 414 is positioned near to or substantially flush with the rear side 18 of the wall 12. The internal assembly 42 is at least partially supported in place via the framing members 500. For example, the framing members 500 may be positioned within the wall 12 to interface with one or more of the side walls 430 of the liner extension 412, with one or more of the side walls 422 of the liner box 410, and/or with the major member 420 of the liner box 410. In one embodiment the internal assembly is screwed into or otherwise coupled with the frame member 500 and/or other portions of the wall 12 adjacent the wall cavity 24. For example, screws, rivets, or other coupling methods may be used to couple the connection tabs 450, 452 (FIG. 4) to the wall 12 and/or the frame members 500.

The front assembly 40 may be either assembled as described above prior to being coupled with the wall 12 or at least partially assembled during coupling of the front assembly 40 with the wall 12. In one example, the front wall plate 300 is first positioned adjacent the front side 16 of the wall 12, and the opening 310 in the front wall plate 300 is aligned with the wall opening 20. When properly positioned, the diverter support segment 312 extends at least partially into the wall cavity 24 and the front wall plate 300 is secured to the wall 12 with any suitable device or materials, such as screws, bolts, rivets, adhesives, etc. In one embodiment, a foam or rubber gasket (not shown) is interposed between the front wall plate 300 and the wall 12 to form a leak-resistant seal.

Once the front wall plate 300 is coupled with the wall 12, the remainder of the front assembly 40 is assembled and coupled with the front wall plate 300 in a similar manner as described above with respect to FIG. 3. More specifically, when the front assembly 40 is installed on the wall 12, the diverter 302 extends through the wall opening 20 and into the wall cavity 24. In one embodiment, the diverter 302 extends a through the liner extension 412 of the internal assembly 42 up to and/or partially through the opening 424 in the liner box 410. As such, donations traveling over the diverter 302 will travel directly into the liner box 210, more particularly, into the proceeds bin 402 maintained within the liner box 210, and will not generally contact the liner extension 412.

Referring to FIG. 1B in view of FIG. 6, the door assembly 44 is coupled with the wall 12 any time after the internal assembly 42 is positioned within the wall cavity 24. First, the rear wall plate 600 is coupled to the rear side 18 of the wall 12. In particular, the rear wall plate 600 is positioned to extend over the wall opening 22 and to align the opening 612 of the rear wall plate 600 with the opening 444 in the liner back plate 414. When the rear wall plate 600 is positioned, the flanges 614 of the rear wall plate extends toward the front of the donation receptacle 14. The finish frame 604 is coupled to the rear wall plate 600 about the opening 612.

The door 602 is assembled with the window 640 and the window bracket 642 as described above. The assembled door 602 is positioned to fit within and to substantially cover the opening 616. More specifically, in one embodiment, the side member 622 extend into the opening 616 as illustrated with additional reference to FIG. 5. Notably, the liner back plate 414, the proceeds bin 402, and the refuse tray 404 (FIG. 1B) are not shown in FIG. 5 to more clearly illustrate the connection of the door 602 to the remainder of the donation receptacle 14. In one embodiment, the pivot member 626 (FIG. 6) extends into a cylindrical cavity defined by the donation receptacle 14 such that the pivot member 626 is rotatable within the cavity. Referring to FIG. 6, in one example a pivot tab 650 is included in the door assembly 44 and defines a cavity or aperture 652 sized to rotatably receive a pivot member 626. The pivot tab 650 is coupled with one or more of the flange members 428 of the liner box 410 or to another support within the internal assembly 40 in a position to receive the pivot member 626 of the door 602. In one embodiment, the pivot tabs 650 are formed of stainless steel to allow for easy and generally smooth rotation of the door 602 relative to the tabs 650.

Figure 5:
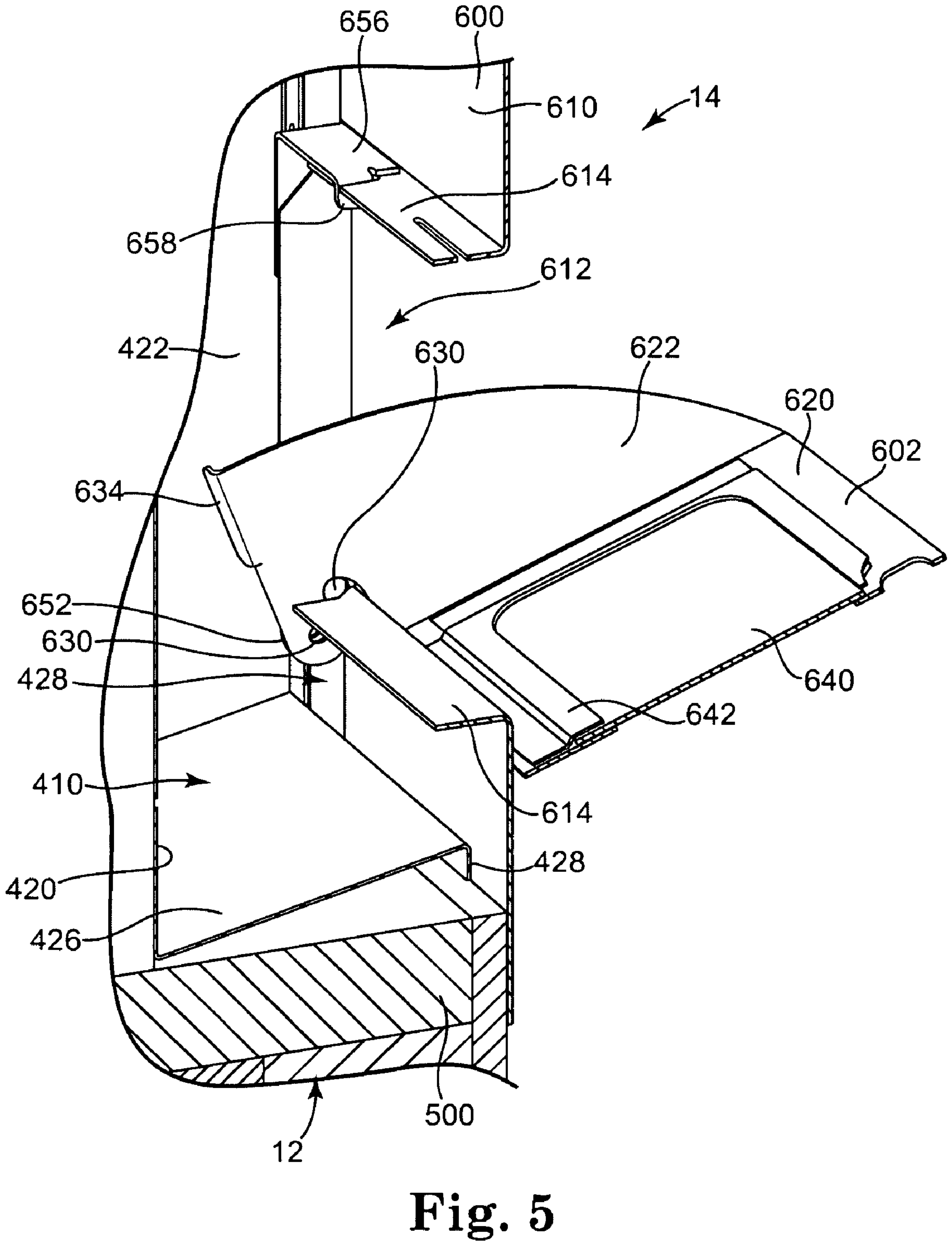
FIG. 5 is a detail, front perspective view illustration of one embodiment of a portion of the donation receptacle of FIG. 1B.

When the door 602 is rotated to an open position as illustrated in FIG. 5, the stop tabs 634 of the door 602 are configured to eventually impact one of the flanges 614 of the rear wall plate 600. When the stop tab 634 impacts the flange 614, rotation of the door 602 is halted thereby generally preventing the door from opening further than desired. In one embodiment, the door assembly 44 additionally includes two door stop brackets 656 each coupled to two adjacent flanges 614 near an upper corner of the opening 612. Each stop bracket 656 includes a protrusion 658 extending downward into the opening 612. When the door 602 is rotated to a closed position, an upper portion of the door 602 contacts the protrusions 658 preventing rotation of the door 602 into the wall cavity 24 and maintaining the door 602 in a position to substantially fully cover the opening 612. In one embodiment, one or both of the pivot tabs 650 and the door stop brackets 656 is formed integrally or separately coupled with the rear wall plate 600 prior to assembly. Notably, the cutouts 630 (FIG. 6) in the door 602 provide clearance for the flange 614 and the portions of the rear wall plate 600 during rotation of the door 602 during use.

In one embodiment, to further secure the donations received within the donation receptacle 14 until their desired removal, a lock 660 is included in door assembly 44 between the door 602 and the rear wall plate 600 to lock the door 602 in a closed position.

Following installation of the donation receptacle 14 in the wall 12, the donation receptacle is ready for use. In one embodiment, the donation receptacle 14 is positioned on either an interior or exterior wall in a place of business. In one embodiment, the front side 16 of the wall is positioned in a high traffic area or other convenient location. In one embodiment, the rear side 18 of the wall 12 is positioned in a non-public location.

During use, ideally, individuals choosing to support a charity or other organization related to the donation receptacle 14 place monetary donations such as coins or bills into the collection inlet 30, or more particularly, upon the extension chute 380. Due to the inclination of the extension chute 380, the donations move via the force of gravity over the extension chute 380 along the donation path 34. Donations continue along the donation path 34 due to gravity, falling from the extension chute 380 onto the diverter 302, over the inclined diverter 302, and into the proceeds bin 402. This process is repeated to at least partially fill the proceeds bin 402.

In some instances, however, more than monetary donations may be placed into the collection inlet 30. For example, beverages, other liquids, or other small refuse items may be placed into the collection inlet 30. In such instances, the portions of perforation within the donation receptacle 14 are configured to separate the donations within the donation receptacle 14 from the unwanted refuse items. In particular, the extension chute 380 is perforated to include the at least one aperture 390 through which at least a portion of the refuse items may fall or drip. Any refuse items that do not move through the aperture(s) 390 generally continue along the donation path 34 to the diverter 302. The diverter 302 is also perforated (i.e., includes the aperture(s) 344) to additionally separate and remove refuse from the donation path 34.

Continuing to refer to FIG. 1B, refuse that moves through the aperture(s) 344 of the diverter 302, falls into the lower bracket 306 of the front assembly 40. Since the lower wall 360 of the lower bracket 306 is angled downward toward the front mounting plate 300, refuse collected in the lower bracket 306 slides due to gravitational forces toward the interface between the lower wall 360 and the front mounting plate 300. As described above and as illustrated with additional reference to FIG. 1A, the interface between the lower wall 360 and the front mounting plate 300 defines a plurality of apertures 378. With this in mind, refuse is drained from the lower bracket 306 and runs out the apertures 378 due to gravitational forces. Accordingly, large amounts of refuse are not generally maintained in the lower bracket 306. In one embodiment, the front side 16 of the wall and the front mounting plate 300 are both configured to be cleaned relatively easily to maintain a clean aesthetic appeal of the donation receptacle.

In some instances, some refuse may travel over the entire diverter 302 without being directed through the aperture(s) 344. Accordingly, in one embodiment, the perforated proceeds bin 402 includes aperture(s) 468 and/or 470 configured to drain refuse away from the donations maintained within the proceeds bin 402. More specifically, refuse moves through the aperture(s) 468 and/or 470 due to gravitational forces and is collected in the refuse tray 404, which is appropriately positioned below the proceeds bin 402.

The donation receptacle 14 is serviceable via the collection outlet 32. In particular, the door 602 is unlocked, if necessary, and rotated to an open position. The proceeds bin 402 is removed from the donation receptacle 14, is emptied as desired, is cleaned, and is eventually replaced within the donation receptacle 14. Once the proceeds bin 402 is replaced, the door 602 is rotated to a closed position, and the door 602 is locked if desired, the cycle of use continues. In one embodiment, when the proceeds bin 402 is removed, the refuse tray 404 can also be accessed and removed from the donation receptacle. The removed proceeds bin 402 is emptied as desired, cleaned, and eventually replaced within the donation receptacle 14 for additional use.

In one embodiment, due to the aperture(s) 468, 470 in the proceeds bin 402, the donations maintained therein can be easily rinsed or washed within the proceeds bin 402 where the excess water used in rinsing the proceeds is drained from the proceeds bin 402 via the aperture(s) 468, 470. When the door 602 is opened other internal portions of the donation receptacle 14, such as the liner 400 and the diverter 302 may also be cleaned as desired.

Without requiring a high level of monitoring, donation receptacles according to the embodiments described herein provide for a general secure manner of collecting donations or other deposits to support a charity or other organization while also being adapted to handle non-donation items or refuse, in particular, liquid refuse. More specifically, the donation receptacles are configured to automatically separate and/or dispose of at least some of the non-donation items received. In this manner, the donations received by the donation receptacle can be more easily removed and forwarded to the corresponding charity.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, although primarily described above as being supported by a wall, in one embodiment, the donation receptacle of the embodiment described above is supported by any other suitable support member, e.g. a stand, post, etc. This application is intended to cover any adaptations or variations of the specific embodiments discussed herein. Therefore, it is intended that this invention be limited only by the claims and the equivalents thereof.

What is claimed is:

1. A method for promoting customer donations at a place of business, the method comprising:

providing a donation receptacle including:

a collection inlet configured to receive monetary donations, a proceeds bin configured to store the monetary donations received via the collection inlet, wherein a donation path is at least partially defined between the collection inlet and the proceeds bin such that the monetary donations received via the collection inlet move along the donation path to the proceeds bin, at least one perforated section positioned along the donation path and being configured to separate the monetary donations from undesired liquid refuse also received via the collection inlet;

forming a cavity through a wall structure at the place of business, the cavity extending between, and forming openings at, opposing front and rear sides of the wall structure; and assembling the donation receptacle to the cavity, including the donation path extending from the front side and the proceeds bin being accessible through the rear side opening.

2. The method of claim 1, wherein the proceeds bin is removable from a remainder of the donation receptacle via the rear side opening.

3. The method of claim 1, wherein the proceeds bin defines at least one aperture on a bottom wall thereof and is one of the at least one perforated section.

4. The method of claim 1, wherein the donation receptacle further includes a diverter plate positioned along the donation path between the collection inlet and the proceeds bin, the diverter plate being configured to support the monetary donations along a portion of the donation path.

5. The method of claim 1, wherein the collection inlet is positioned on the front side of the wall structure.

6. The method of claim 5, wherein the donation receptacle further includes:

a first assembly positioned on the front side of the wall structure and defining the collection inlet, the first assembly being configured to drain at least a portion of the undesired liquid refuse from the donation receptacle;

an internal assembly positioned within the cavity of the wall structure and coupled with the first assembly, the internal assembly including the proceeds bin; and a door assembly positioned on the rear side of the wall structure and coupled with the internal assembly, the door assembly including a door to selectively cover a collection outlet on the rear side of the wall structure, wherein the proceeds bin is accessible via the collection outlet.

7. The method of claim 1, further comprising:

collecting monetary deposits via the collection inlet;

advancing the collected monetary deposits along the donation path and to the proceeds bin;

separating the monetary deposits from undesired liquid refuse, if any, collected via the collection inlet;

removing the proceeds bin to retrieve the collected monetary deposits; and replacing the proceeds bin in the receptacle.

8. The method of claim 7, wherein separating the monetary deposits from the undesired refuse includes:

separating the monetary deposits from a first portion of the undesired refuse as the monetary deposits are advanced along the donation path and before the monetary deposits reach the proceeds bin; and separating the monetary deposits from a second portion of the undesired refuse by draining the second portion of the undesired refuse from the proceeds bin.

* * * * *